United States Patent
Sterling

(10) Patent No.: US 10,779,511 B1
(45) Date of Patent: Sep. 22, 2020

(54) PORTABLE HEATED PET WASHER

(71) Applicant: Donald B. Sterling, Martinez, GA (US)

(72) Inventor: Donald B. Sterling, Martinez, GA (US)

(*) Notice: Subject to any disclaimer, the term of this patent is extended or adjusted under 35 U.S.C. 154(b) by 329 days.

(21) Appl. No.: 15/401,538

(22) Filed: Jan. 9, 2017

Related U.S. Application Data

(60) Provisional application No. 62/276,512, filed on Jan. 8, 2016.

(51) Int. Cl.
*B08B 3/02* (2006.01)
*A01K 13/00* (2006.01)

(52) U.S. Cl.
CPC ............ *A01K 13/001* (2013.01); *B08B 3/026* (2013.01); *B08B 2203/007* (2013.01); *B08B 2203/0211* (2013.01)

(58) Field of Classification Search
CPC ....... B05B 9/007; B05B 9/002; B05B 7/1693; B05B 7/0093; A01K 13/001; B08B 2203/007; B08B 3/26
USPC ... 239/128, 135, 146, 147, 148, 152, 69, 71, 239/72, 75; 119/665
See application file for complete search history.

(56) References Cited

U.S. PATENT DOCUMENTS

| | | | | |
|---|---|---|---|---|
| 3,680,786 A * | 8/1972 | Levy | ...................... | B08B 3/026 239/146 |
| 5,174,495 A * | 12/1992 | Eichholz | ............ | G05D 23/1393 236/12.12 |
| 5,684,717 A * | 11/1997 | Beilfuss | .................. | F27D 19/00 340/584 |
| 2005/0077391 A1* | 4/2005 | Powell | .................. | B05B 9/0423 239/373 |
| 2007/0175883 A1* | 8/2007 | Miu | ...................... | F24H 9/2021 219/400 |
| 2008/0259056 A1* | 10/2008 | Freier | ................ | G05D 23/1393 345/184 |
| 2012/0111971 A1* | 5/2012 | Chang | ....................... | F24H 1/06 239/128 |
| 2013/0333764 A1* | 12/2013 | Wright | ...................... | E03C 1/02 137/1 |
| 2014/0263729 A1* | 9/2014 | Stewart | ................. | B05B 7/2467 239/154 |

* cited by examiner

*Primary Examiner* — Tuongminh N Pham
(74) *Attorney, Agent, or Firm* — Cramer Patent & Design, PLLC; Aaron R. Cramer

(57) ABSTRACT

A portable heated pet washing apparatus includes an electric inline water heater secured a rectangular housing. Fluid inlet and outlet hose connectors are located on opposite faces of the housing for attachment of a fluid source and a spray hose. The device rests upon a planar surface having a leg on the underside of each corner of the surface. The entire device is capable of being carried via a handle.

9 Claims, 3 Drawing Sheets

PORTABLE HEATED PET WASHER

RELATED APPLICATIONS

The present invention is a continuation-in-part of, was first described in and claims the benefit of U.S. Provisional Application No. 62/276,512 filed Jan. 8, 2016, the entire disclosures of which are incorporated herein by reference.

FIELD OF THE INVENTION

The present invention relates generally to a portable heated pet washing apparatus.

BACKGROUND OF THE INVENTION

Keeping pets is a never-ending task, requiring one to constantly feed, groom, and clean up after their animal friends. Those that keep animals such as dogs know the importance of a frequent bathing to keep their pet's coat healthy, clean, and fresh smelling. For this bathing process, many take their pets to pet grooming salons. However, the costs associated with this can add up quickly. Others may bathe their pet in a sink or bathtub, but many owners may be unable to get their pets into such a location, if they fit at all. Finally, others may wash their pet outdoors, but many do not have access to warm water at a suitable location. Accordingly, there exists a need for a means by which pets can be easily and thoroughly bathed in almost any outdoor location with warm water and without the limitations as described above. The use of the portable heated pet washer allows for the washing and bathing of dogs and other animals in outdoor locations in a manner which is quick, easy, and effective.

SUMMARY OF THE INVENTION

The inventor has recognized the aforementioned inherent problems and lack in the art and observed that there is a need for a portable heated pet washing apparatus.

It is therefore an object of the invention to provide an a washing apparatus comprising a housing having a top panel, a bottom panel, and a plurality of side panels defining an interior, an inlet connector which is disposed through a first side panel, an outlet connector which is disposed through a second side panel, opposite the inlet connector, an interior line which is secured within the interior of the housing, having a first end in fluid communication with the inlet connector and a second end in fluid communication with the outlet connector, at least one (1) water heater which is in thermal communication with the interior line, a fluid storage tank which is in fluid communication between a second end of the interior line and the outlet connector, a temperature sensor which is located within the fluid storage tank and is configured to provide fluid storage tank temperature data and a control means which is disposed on one (1) of the plurality of side panels and is in electrical communication with a power source, the temperature sensor and each water heater.

The inlet connector is adapted to be connected to and in fluid communication with a supply hose. The outlet connector is adapted to be connected to and in fluid communication with a spray hose. The means for controlling comprises a temperature selection means for enabling a user to actuate the apparatus and select a set-point temperature for each water heater. The means for controlling is adapted to be in electrical communication with a power source.

The means for controlling may also comprise a logic control circuit which is in communication with a digital display. The digital display may be programmed to visually communicate temperature data relating to the set-point temperature and the fluid storage tank temperature data. The means for controlling may also comprise a display selector switch in electrical communication with the logic control circuit and the digital display. The display selector switch is configured to enable the user toggle the temperature data between the set-point temperature and the fluid storage tank temperature data.

The means for controlling may also comprise a power indicating lamp which is in communication with the power source. The power indicating lamp is illuminated when the control module is powered. The means for controlling may also comprise an at-temperature indicating lamp which is in communication with the power source. The at-temperature indicating lamp is illuminated when the set-point temperature is reached by each the water heater. The means for controlling may also comprise of a high temperature limit control in communication with the logic control circuit.

A platform may be affixed to the bottom panel which has a plurality of legs secured on an underside face of the platform and a handle affixed to the top panel. The platform and bottom panel may be integral. The set-point temperature may be set at one hundred twenty degrees Fahrenheit (120° F.).

In an alternate embodiment, the apparatus also comprises a spray hose connected to and in fluid communication with the outlet connector. The spray hose may further have a spray head at a distal end and a shut off valve subjacent the spray head.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
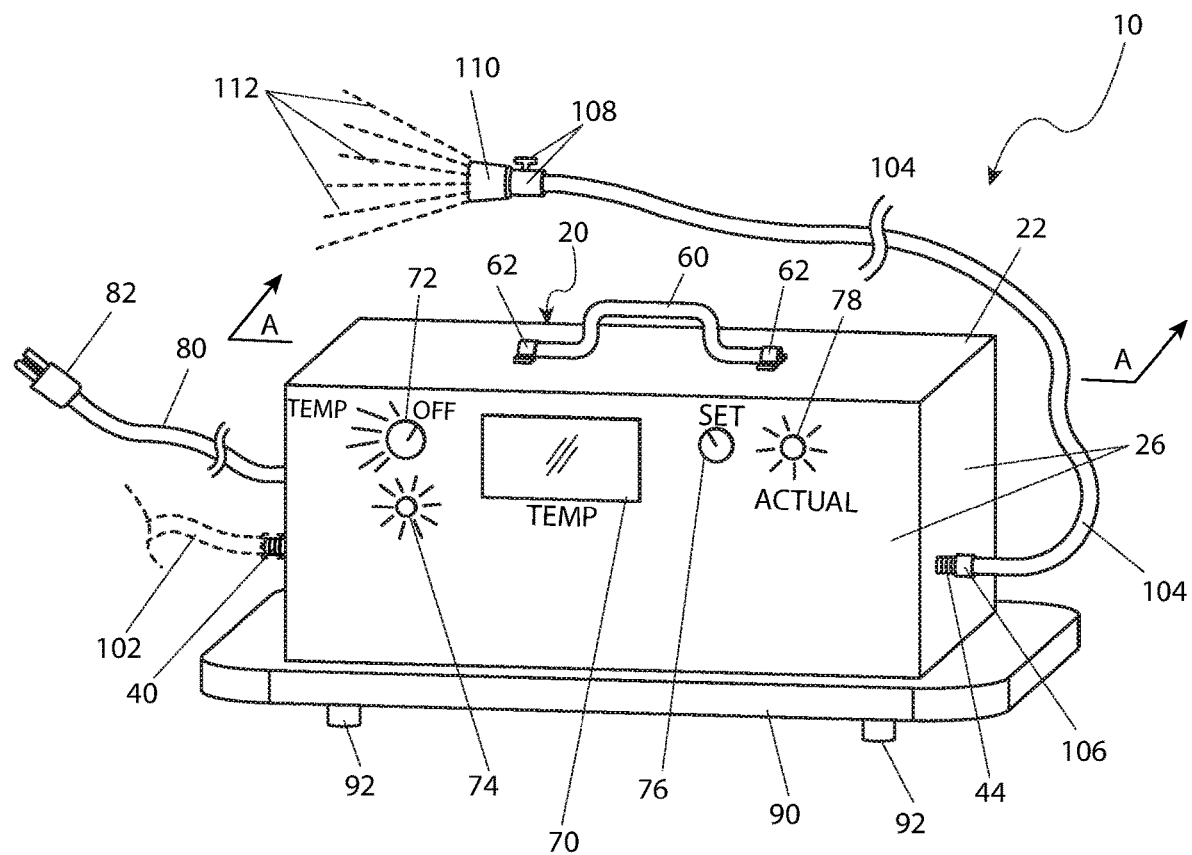
FIG. 1 is a perspective view of a portable heated pet washer 10, according to a preferred embodiment of the present invention.

10 portable heated pet washer
20 housing
22 top panel
24 bottom panel
26 side panel
40 inlet fluid connector
42 heated pipe section
44 outlet fluid connector
50 fluid storage tank
60 carrying handle
62 handle bracket
64 fastener
70 controller/display module 72 temperature selector switch
74 on/off indicator lamp
76 display selector switch
78 "at-temperature" indicator lamp
80 power cord
82 electrical plug
83 heater wiring
84a first heater
84b second heater
86 heating element
87 temperature sensor
88 control wiring
90 platform
92 foot
100 fluid
102 fluid supply hose
104 spray hose
106 hose coupling
108 shut-off valve
110 spray head
112 fluid spray
200 power switch
205 logic control circuit
210 temperature set-point controller
215 high temperature limit control
220 digital display driver

DETAILED DESCRIPTION OF THE PREFERRED EMBODIMENT

Figure 2:
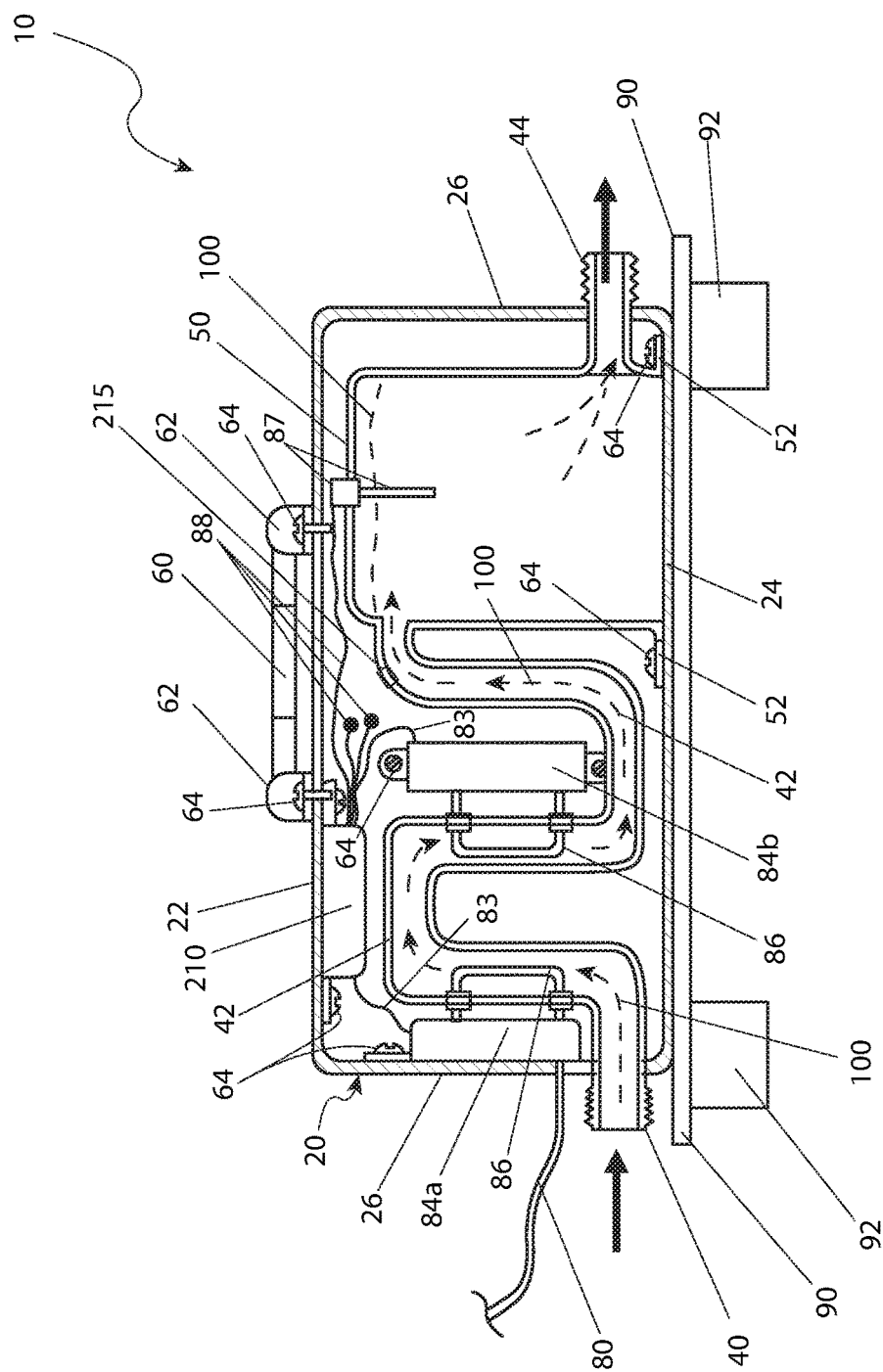
FIG. 2 is a sectional view of the portable heated pet washer 10 taken along section line A-A (see FIG. 1), according to a preferred embodiment of the present invention; and, FIG. 3 is an electrical block diagram depicting the major electrical components of the portable heated pet washer 10, according to a preferred embodiment of the present invention.
Figure 3:
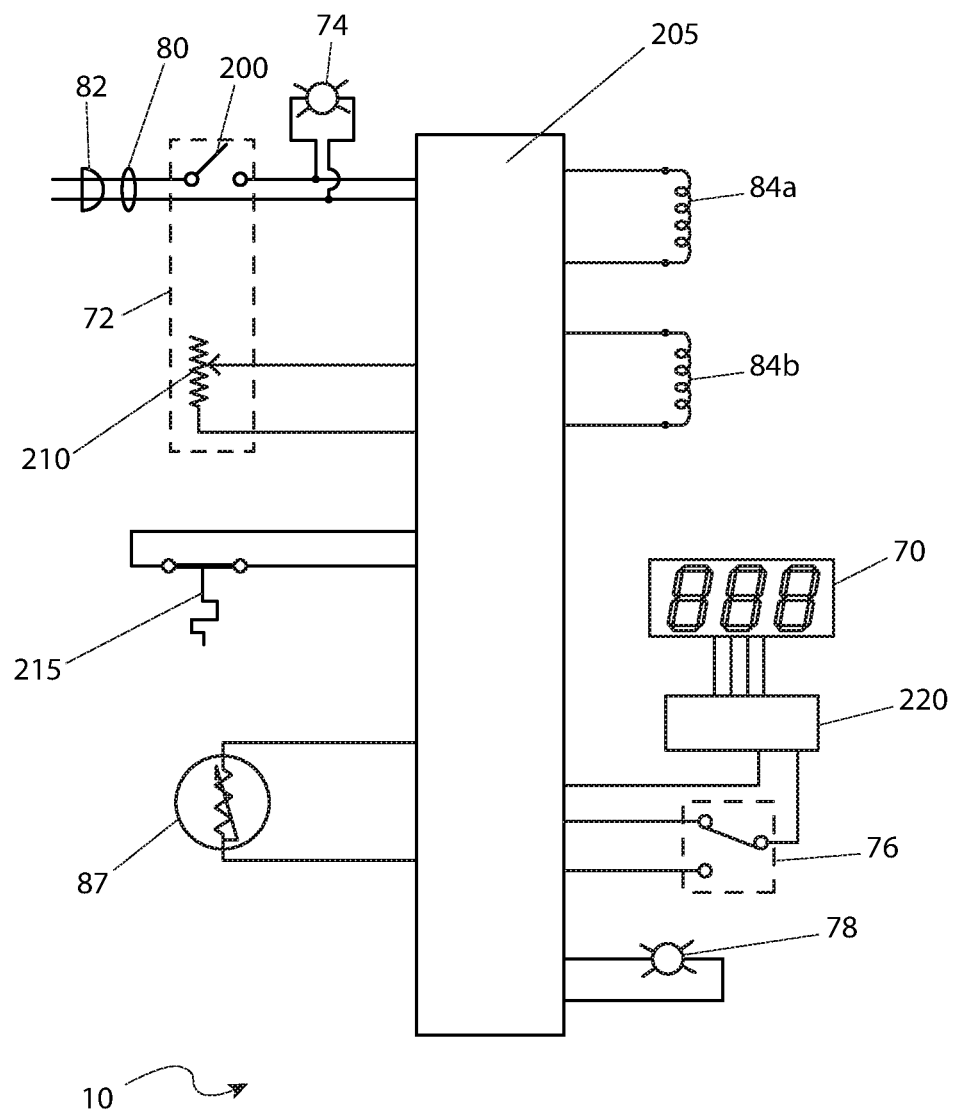

The best mode for carrying out the invention is presented in terms of its preferred embodiment, herein depicted within FIGS. 1, 2, and 3. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope.

The terms "a" and "an" herein do not denote a limitation of quantity, but rather denote the presence of at least one (1) of the referenced items.

The present invention describes a portable heated pet washer (herein described as the "apparatus") 10, which provides a pet washing apparatus having plumbing portions which include internal water heaters 84a, 84b which are secured within a rectangular housing 20. The housing 20 provides for removable attachment of a fluid supply hose 102, such as a garden hose, and a spray hose 104 which in turn includes a spray head 110, thereby allowing a user to wash a pet with the heated fluid 100. The apparatus 10 may be easily transported via a handle 60.

Referring now to FIGS. 1 and 2, perspective and sectional views of the apparatus 10, according to the preferred embodiment of the present invention, are disclosed. The housing 20 portion of the apparatus 10 is envisioned to be a plastic or metal rectangular enclosure which provides protective waterproof protection of internal plumbing, heating, and fluid storage equipment. The apparatus 10 is envisioned to utilize and process a fluid 100, such as water or a mixture of water and substances such as soap, medicating liquids, and the like, to aid in the washing of a pet. The housing 20 provides a means to mount various internal equipment including at least one (1) water heater 84a, 84b, a temperature control display 70, a fluid storage tank 50, using a plurality of fasteners 64. The apparatus 10 also includes a supporting and stabilizing platform 90. The apparatus 10 is envisioned to receive electrical power via a power cord 80 having an integral electrical plug 82, by utilizing an existing electrical outlet.

The rectangular housing 20 provides a six-sided structure having a top panel 22, a bottom panel 24, and four (4) side panels 26. The housing 20 also provides an inlet fluid connector 40 and an outlet fluid connector 44, located on opposite side panel portions 26 for the removable attachment of the fluid supply hose 102 and the spray hose 104, respectively. The housing 20 is envisioned to be approximately eight inches (8 in.) in width, ten inches (10 in.) in height, and sixteen inches (16 in.) in length. A pressurized fluid 100 is received into the apparatus 10 from an existing fluid supply hose 102 being threadingly affixed to the inlet fluid connector 40. The fluid 100 then flows through a heated pipe section 42, flowing over at least one (1) "immediate-heat-type" liquid heater 84a, 84b. An embodiment of the apparatus 10 is illustrated here utilizing a first heater 84a and a second heater 84b, in electrical communication with each other via heater wiring 83 and in electrical communication with the controller/display module 70 via control wiring 88.

Each heater 84a, 84b includes a respective electric in-line heating element 86 positioned within respective fluid flow portions of the heated pipe section 42. However, it is understood that various methods of heating the fluid 100 may be utilized with equal benefit, and as such should not be interpreted as a limiting factor of the apparatus 10. The fluid 100 subsequently flows into a storage tank 50, also located within the housing 20, where the heated fluid 100 is collected and ready for use. The storage tank 50 provides a pressure-rated container being in fluid communication with the aforementioned outlet fluid connector 44, in turn providing a means for the heated fluid 100 to exit the housing 20 when needed. The outlet fluid connector 44 in turn threadingly engages a hose coupling portion 106 of the spray hose 104 in a removable manner. The spray hose 104 is to be of sufficient length and fluid flow capacity to enable a user to apply the heated and pressurized fluid 100 directly onto the pet in a hand-held manner The spray hose 104 includes integral or threadingly assembled portions including a shut-off valve 108 and a fluid dispersing spray head 110.

The apparatus 10 provides electrical and electronic equipment to control the heating of, and the temperature control of the fluid 100. An embodiment of the apparatus 10 is illustrated here including a controller/display module 70, a temperature selector switch 72, and a display selector switch 76. The controller/display module 70 is envisioned to be a microprocessor-based unit having an LCD, or equivalent display screen which displays information such as, but not limited to: a pre-set temperature, an actual fluid temperature, and the like. The portable heated pet washer 10 provides for a logic control circuit 205 located at the top of the housing 20 and a high temperature limit control 215 to provide overheating protection. The temperature selector switch 72 enables a user to select from a range of safe fluid temperature settings and also includes an "off" position. The display selector switch 76 allows a user to toggle between display of the set temperature and the actual temperature of the fluid within the fluid storage tank 50, being detected via a submerged temperature sensor 87 also in electrical communication with the controller/display module 70 via additional control wiring 88. The temperature selector switch 72 and the display selector switch 76 are shown here having respective on/off indicator lamp 74 and "at-temperature" indicator lamp 78 portions. The "at-temperature" indicator lamp 78 indicates to a user when the fluid 100 has obtained the previously selected set temperature.

Referring next to FIG. 3, an electrical block diagram depicting the major electrical components of the apparatus 10 along with their interconnection is depicted. Electrical power is provided by the electrical plug 82 through the power cord 80. A power control switch 200 provided as part of the temperature selector switch 72 controls overall power to the apparatus 10. When energized power flows to the on/off indicator lamp 74 as well as the logic control circuit 205. A temperature set-point controller 210, also part of the temperature selector switch 72 controls the overall operating temperature of the first heater 84a and the second heater 84b. The high temperature limit control 215 shuts down the first heater 84a and the second heater 84b should an overall safe operating temperature be exceeded, envisioned to be set at forty-nine Celsius (49° C.; 120° F.). The temperature sensor 87 provides temperature data of the fluid 100 (as shown in FIG. 2). The temperature sensor 87 works in conjunction with the temperature set-point controller 210 to regulate the operating temperature of the apparatus 10. The display selector switch 76 then selects the temperature set point as provided by the temperature set-point controller 210 or the actual current operating temperature as provided by the temperature sensor 87. The resultant temperature is sent through a digital display driver 220 and onto the controller display module 70. Should the temperatures be equal, the "at-temperature" indicator lamp 78 is energized.

The housing 20 is integral to, or otherwise affixed to a subjacent planar platform 90 having an integral foot portion 92 located upon the underside of each corner of the platform 90. The platform 90 and the feet 92 act to protect the apparatus 10 from fluid 100 which has accumulated around the apparatus 10 during use, by elevating the housing 20 to a safe height of approximately two inches (2 in.) above a ground surface.

The top-mounted carrying handle 60 is secured to a top panel portion 22 of the housing 20 in a rotating manner using a pair of handle brackets 62, in turn secured to the housing 20 using a plurality of fasteners 64. The portable design of the apparatus 10 enables a user to transport and use the apparatus 10 upon driveways, patios, decks, or other suitable outdoor locations when washing and bathing a pet.

It is envisioned that other styles and configurations of the present invention can be easily incorporated into the teachings of the present invention, and only one (1) particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed as indicated in FIG. 1.

The method of configuring and utilizing the apparatus 10 may be achieved by performing the following steps: procuring the apparatus 10; assembling the spray hose 104 to the housing 20 by threadingly engaging the hose coupling portion 106 of the spray hose 104 to the outlet fluid connector 44; motioning the shut-off valve portion of the spray hose 104 to an "off" position; connecting a pressurized fluid supply hose 102, such as a garden hose, to the apparatus 10 by threadingly engaging the fluid supply hose 102 to the inlet fluid connector 40; connecting the apparatus 10 to an electrical outlet using the power cord 80 and electrical plug 82 portions; selecting a fluid temperature setting using the temperature selector switch 72 while observing the set temperature upon the controller/display module 70; toggling between display of the set temperature and the actual temperature of the fluid 100 within the fluid storage tank 50, as displayed upon the controller/display module 70, until the "at-temperature" indicator lamp 78 illuminates; grasping the spray hose 104 for use in a hand-held manner; initiating a dispersing flow of heated fluid 100 from the spray head 110 by opening the shut-off valve 108; spraying and washing one's pet as need; closing the shut-off valve 108 when finished; shutting off the heaters 84a, 84b by motioning the temperature selector switch 72 until the on/off indicator lamp 74 goes out; unplugging the power cord 80; remove the fluid supply hose 102 and spray hose 104 from the housing 20; allowing all fluid 100 within the apparatus 10 to drain out; storing the apparatus 10 away until needed again; and, benefiting from a portable means to wash one's pet in a comfortable manner using a heated fluid 100, afforded a user of the present invention 10.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:
1. A portable heated pet washer, comprising:
a housing having a top panel, a bottom panel, and a plurality of side panels defining an interior;
an inlet connector disposed through a first side panel;
an outlet connector disposed through a second side panel, said outlet connector opposite said inlet connector;
an interior line secured within said interior of said housing, said interior line having a first end in fluid communication with said inlet connector and a second end in fluid communication with said outlet connector;
at least one water heater in thermal communication with said interior line;
a fluid storage tank in direct fluid communication between said second end of said interior line and said outlet connector;
a temperature sensor located within said fluid storage tank to provide a plurality of fluid storage tank temperature data;
a control means disposed on one of said side panels in electrical communication with a power source, said temperature sensor and each water heater;
a platform integral to said bottom panel having a plurality of legs secured on an underside face of said platform or affixed to said bottom panel having a plurality of legs secured on an underside face of said platform; and
a top-mounted carrying handle directly affixed to and extending upward from a middle portion of said top panel configured for lifting the washer;
wherein said inlet connector is connected to and in fluid communication with a supply hose;
wherein said outlet connector is connected to and in fluid communication with a spray hose
wherein said control means further comprises a logic control circuit in communication with a digital display programmed to visually communicate temperature data relating to a set-point temperature and said fluid storage tank temperature data;

wherein a display selector enables toggling a temperature display; and wherein the housing encloses the at least one water heater, temperature sensor and the fluid storage tank entirely.

2. The portable heated pet washer of claim 1, wherein said control means further comprises a power indicating lamp in communication with said power source;

wherein said power indicating lamp is illuminated when said control means is powered.

3. The portable heated pet washer of claim 2, wherein said control means further comprises an at temperature indicating lamp in communication with said power source;

wherein said at-temperature indicating lamp is illuminated when said set-point temperature is reached by each said water heater.

4. The portable heated pet washer of claim 3, wherein said control means further comprises a high temperature limit control in communication with said logic control circuit.

5. The portable heated pet washer of claim 3, wherein said set-point temperature is 120° F.

6. A portable heated pet washer, comprising:

a housing having a top panel, a bottom panel, and a plurality of side panels defining an interior;

an inlet connector disposed through a first side panel;

an outlet connector disposed through a second side panel, said outlet connector opposite said inlet connector;

a spray hose connected to and in fluid communication with said outlet connector;

an interior line secured within said interior of said housing, said interior line having a first end in fluid communication with said inlet connector and a second end in fluid communication with said outlet connector;

at least one water heater in thermal communication with said interior line;

a fluid storage tank in direct fluid communication between a second end of said interior line and said outlet connector;

a temperature sensor located within said fluid storage tank to provide fluid storage tank temperature data;

a control means disposed on one of said side panels in electrical communication with a power source, said temperature sensor and each water heater;

a platform integral to said bottom panel having a plurality of legs secured on an underside face of said platform or affixed to said bottom panel having a plurality of legs secured on an underside face of said platform; and a top-mounted carrying handle directly affixed to and extending upward from a middle portion of said top panel configured for lifting the washer;

wherein said inlet connector is connected to and in fluid communication with a supply hose wherein said control means further comprises a logic control circuit in communication with a digital display programmed to visually communicate temperature data relating to said set-point temperature and said fluid storage tank temperature data;

wherein a display selector enables toggling a temperature display;

wherein said control means further comprises an at-temperature indicating lamp in communication with said power source;

wherein said at-temperature indicating lamp is illuminated when said set-point temperature is reached by each said water heater;

wherein said control means further comprises a high temperature limit control in communication with said logic control circuit;

wherein the housing encloses the at least one water heater, temperature sensor and the fluid storage tank entirely.

7. The portable heated pet washer of claim 6, wherein said control means further comprises a power indicating lamp in communication with said power source;

wherein said power indicating lamp is illuminated when said control means is powered.

8. The portable heated pet washer of claim 6, wherein said spray hose further comprises a spray head at a distal end and a shut off valve subjacent said spray head.

9. The portable heated pet washer of claim 6, wherein said set-point temperature is 120° F.

\* \* \* \* \*